United States Patent [19]

Flammini

[11] 4,286,818

[45] Sep. 1, 1981

[54] PURSE SEINE RING TIE

[76] Inventor: Dominick J. Flammini, 7946 Laurelridge Rd., San Diego, Calif. 92120

[21] Appl. No.: 107,098

[22] Filed: Dec. 26, 1979

[51] Int. Cl.³ .............................................. B66C 1/12
[52] U.S. Cl. .................................................... 294/77
[58] Field of Search ....................... 294/74, 75, 76, 77; 43/14, 17.2, 7, 15; 24/30, 5 W, 15 M, 132 WL, 201 A, 265 BC, 265 BB

[56] References Cited

U.S. PATENT DOCUMENTS 746,197  12/1903  Strickler ................................ 294/75
4,142,754  3/1979  Colvin .................................. 294/77

Primary Examiner—James B. Marbert
Attorney, Agent, or Firm—Knox & Knox

[57] ABSTRACT

A ring tie for releasably attaching the rings for the pursing cable to the bottom of a purse seine net, the ring tie having three principal sections, namely a body member, a clasp member which is releasably locked to the body member, and a shackle secured to and between these members and depending therefrom, this shackle being flexible and scissile.

4 Claims, 7 Drawing Figures

U.S. Patent  Sep. 1, 1981  4,286,818
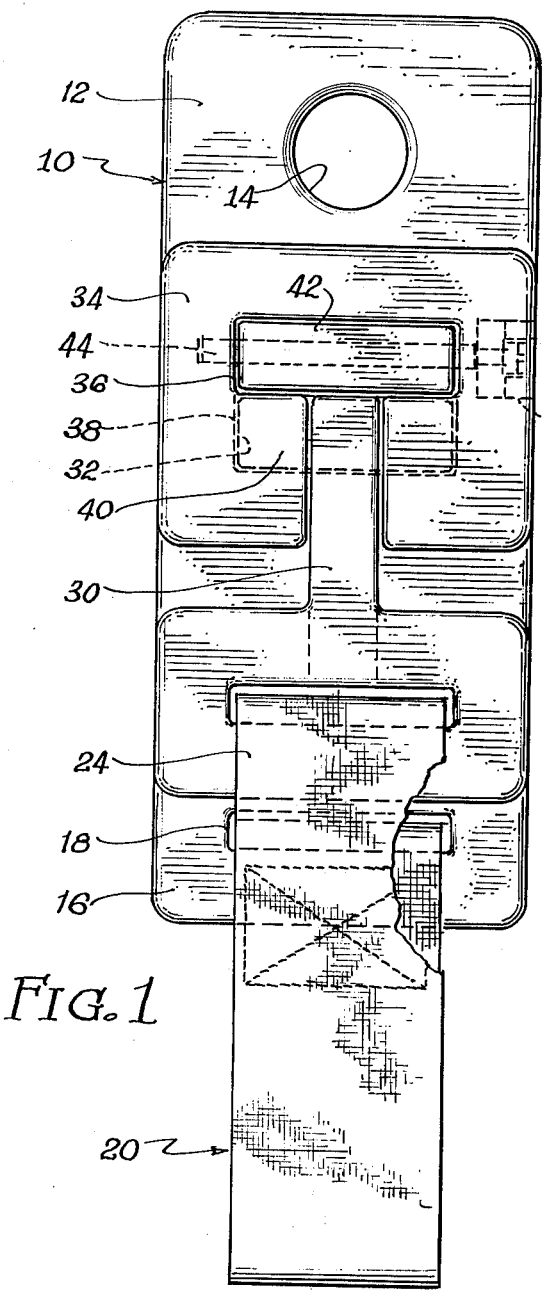
FIG. 1
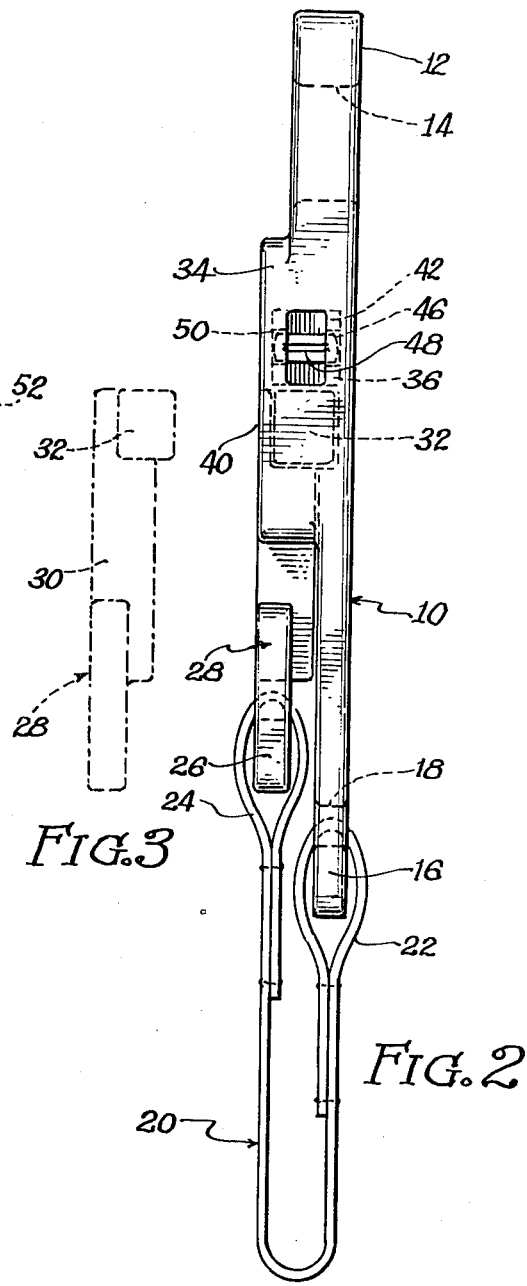
FIG. 2
FIG. 3
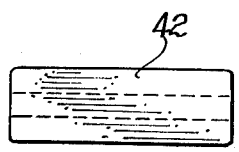
FIG. 4
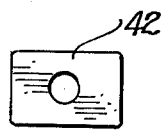
FIG. 5
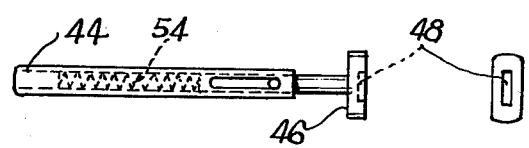
FIG. 6
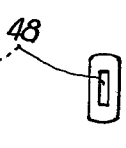
FIG. 7

PURSE SEINE RING TIE

BACKGROUND OF THE INVENTION

In commercial seine net fishing the open bottomed net is deployed with supporting floats at the top and a pursing cable is threaded through heavy rings attached along the lower edge of the net by an equal number of bridles. The bridles are usually of metal chain link type and the pursing cable rings are secured thereto usually by nylon twine. The abrasion caused by the steel pursing cable is troublesome since the rings tend to orient in one or other of two positions after initiation of wear. In making repeated sets of the net a ring may become caught on the cable or the rings themselves get tangled in the net and seine fisherman in such emergencies have to cut such rings loose. There is a need therefore for a ring tie which obviates the necessity for the laborious tying of the rings thus facilitating their replacement, and which can still be freed by cutting in emergencies to free a tangled ring.

SUMMARY OF THE INVENTION

As claimed this invention is an adequate response to the immediately abovementioned need and comprises as illustrated a ring tie which is substituted for the prior art connection between the bridle and the seine ring, this ring tie having a shackle of leather or other flexible scissile material in a wide strap form, secured terminally to and between a body member and a clasp or terminal which latter is releasibly locked in position upon the body member. The locking means for this terminal is easily intentionally disengaged by the removel of a locking pin to permit replacement to the ring and/or the tie or the scissile shackle can be cut in emergencies such as entanglement of the corresponding ring.

BRIEF DESCRIPTION OF THE DRAWING

FIG. 1 is a front elevational view of the ring tie in closed and locked mode as when in use in connecting a bridle above, not shown, and a seine ring which latter is not shown but will be understood as hung in the strap shackle, this figure including a holder block and locking pin in functional position.

FIG. 2 is a side elevational view of the structure shown in FIG. 1.

FIG. 3 is a similar view of the clasp or terminal of the strap shackle in a second position a dash line illustrating the clasp or terminal removed from the body member and before this clasp or terminal is manipulated into the slot of the body member and captured by the holder block.

FIG. 4 is a side elevational view of the holder block.

FIG. 5 is an end elevational view of the holder block.

FIG. 6 is a plan view of the locking pin.

FIG. 7 is an end view of the locking pin taken from the right-hand end of FIG. 6.

DETAILED DESCRIPTION OF A PREFERRED EMBODIMENT

Referring now to the drawings wherein like numerals refer to like or identical parts and portions throughout the several views, this ring tie comprises a body member generally indicated by the numeral 10. The body member 10 has an upper end portion 12, the figures of the drawing representing the structure as oriented in use, with an aperture 14 illustrating means for attachment, usually by a bridle not shown, to a net. The lower end portion 16 of the body member 10 has a transverse closed slot 18 illustrating means for substantially permanent attachment of a strap shackle 20 which has a looped end 22 formed as by sewing, riveting or the equivalent.

The other end 24 of the strap shackle 20 is similarly secured to the lower end 26 of the clasp or terminal generally indicated at 28. A vertical shank portion 30 of the clasp or terminal 28 has at the upper end thereof an enlargement indicated as a cross bar 32. A thickened intermediate portion 34 of the body member 10 has a receptor illustrated as a T-slot 36 to accept the shank portion 30 and cross bar 32 and this T-slot 36 is continued downwardly as indicated in dash line at 38 behind a face plate portion 40 so that the cross bar 32 may be depressed behind the face plate portion 40 and thus captured in the receptor T-slot 36.

To retain the cross bar 32 of the clasp or terminal 28 in the downwardly continued portion 38 of the receptor T-slot 36 a holder is provided as illustrated by a simple block 42 dimensioned to fit within the head of the T-slot 36. In turn, the block 42 is locked in this position by a locking pin 44 which extends through the block 42 as indicated best in FIG. 1 and through adjacent parts of the thickened portion 34. This pin 44 has a cross head 46 with screwdriver slot 48 or the equivalent therein whereby the crosshead 46 may be locked by being turned crosswise to engage in a radially enlarged inner portion 50 of the pin admittance opening 52 in the edge of the thickened portion 34. The locking pin 44 as illustrated is telescopic with a captured spring 54 to urge the pin to extend longitudinally and thus be retained by the crosshead 46 as manually positioned in locking position.

It will be understood that a seine pursing ring will be supported by the shackle 20 which depends in the manner of the shackle of an inverted padlock. It will also be understood that a split link or the equivalent will be inserted through the aperture 14 to attach the ring tie to a bridle.

From the foregoing it will be clear how the disclosed structure is used. The seine rings are made easily replaced when necessary, upon withdrawal of the pursing cable, and the entire ring tie can be removed and replaced easily when necessary. In emergencies when rings become entangled the scissile strap shackle 20 can simply be cut to help free an entangled ring, and the cut strap shackle or the entire ring tie can be replaced expeditiously when the net is on deck.

What I claim as new, and desire to secure by Letters Patent, is:

1. A ring tie for releasibly attaching pursing rings to a seine net, comprising:
   (a) a body member having means for substantially permanent attachment to a seine net;
   (b) a clasp member with releasible connector means comprising a receptor in said body member, a portion of said clasp slidably received in said receptor, and a removable holder retaining said portion in said receptor, whereby the clasp member is substantially permanently connected to said body member for regular operation yet capable of easy disconnection for purposes of maintenance and replacement;
   (c) a short strap shackle secured to and between said members and depending therefrom, in the manner of a shackle of an inverted padlock, for connection onto a pursing ring, and said said strap shackle being scissile to permit intentional cutting thereof in emergencies during use.

2. A ring tie according to claim 1 wherein said receptor is a slot closed at one end and the holder is a removable block in a position in said slot to prevent escape of said portion of the clasp from said slot.

3. A ring tie according to claim 2 and including a lock means to lock said block in said position.

4. A ring tie according to claim 3 wherein said lock means is body releasible pin holding said block to said block member against unintentional removal.

* * * * *

UNITED STATES PATENT AND TRADEMARK OFFICE
CERTIFICATE OF CORRECTION

PATENT NO. : 4,286,818
DATED : Sep. 1, 1981
INVENTOR(S) : Dominick J. Flammini

It is certified that error appears in the above—identified patent and that said Letters Patent is hereby corrected as shown below:

Column 4, (Claim 4)
  Line 4, delete "body" and substitute --a-- ;
  Line 5, delete "block" and substitute --body--.

Signed and Sealed this

Twenty-fourth Day of November 1981

[SEAL]

Attest:

GERALD J. MOSSINGHOFF

Attesting Officer   Commissioner of Patents and Trademarks